(12) United States Patent
Lee

(10) Patent No.: US 12,461,553 B2
(45) Date of Patent: Nov. 4, 2025

(54) CLOCK DRIVER, OPERATING METHOD THEREOF, MEMORY DEVICE INCLUDING CLOCK DRIVER, AND MEMORY SYSTEM

(71) Applicant: SAMSUNG ELECTRONICS CO., LTD., Suwon-si (KR)

(72) Inventor: Bumsoo Lee, Suwon si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 18/476,508

(22) Filed: Sep. 28, 2023

(65) Prior Publication Data

US 2024/0248511 A1    Jul. 25, 2024

(30) Foreign Application Priority Data

Jan. 25, 2023  (KR) .................. 10-2023-0009259

(51) Int. Cl.
*G06F 1/12*  (2006.01)
*G06F 1/08*  (2006.01)

(52) U.S. Cl.
CPC . *G06F 1/12* (2013.01); *G06F 1/08* (2013.01)

(58) Field of Classification Search
CPC ............. G06F 1/12; G06F 1/08; G06F 1/3275
See application file for complete search history.

(56) References Cited

U.S. PATENT DOCUMENTS

| | | | |
|---|---|---|---|
| 6,154,415 A | 11/2000 | Jeong | |
| 6,433,607 B2 | 8/2002 | Kawasaki et al. | |
| 6,597,617 B2 | 7/2003 | Ooishi et al. | |
| 6,870,790 B2 | 3/2005 | Horiguchi et al. | |
| 7,028,200 B2 | 4/2006 | Ma | |
| 7,522,469 B2 | 4/2009 | Lee | |
| 8,295,122 B2 | 10/2012 | Kim et al. | |
| 8,824,235 B2 | 9/2014 | Balluchi et al. | |
| 9,087,568 B1* | 7/2015 | Ware | G11C 11/4076 |
| 9,542,986 B2 | 1/2017 | Chen et al. | |
| 2005/0206410 A1 | 9/2005 | Suh | |
| 2008/0201496 A1* | 8/2008 | Gillingham | G11C 7/1093 710/23 |
| 2009/0219779 A1* | 9/2009 | Mao | G06F 13/1684 365/233.13 |
| 2017/0221544 A1 | 8/2017 | Chen et al. | |
| 2020/0185013 A1 | 6/2020 | Chang | |

OTHER PUBLICATIONS

Extended European Search Report dated Apr. 4, 2024 in corresponding European Patent Application No. 23204785.2, 7 pages.

* cited by examiner

*Primary Examiner* — Stefan Stoynov
(74) *Attorney, Agent, or Firm* — Morgan, Lewis & Bockius LLP

(57) ABSTRACT

The present disclosure provides a clock driver, an operating method thereof, a memory device including the clock driver, and a memory system. A clock driver according to an embodiment includes a differential buffer configured to output a differential amplified clock signal pair based on a differential external clock signal pair, and a signal coupler configured to generate a differential internal clock signal pair based on the differential amplified clock signal pair, and output a chip enable signal to the memory chip based on the differential internal clock signal pair.

20 Claims, 14 Drawing Sheets

CLOCK DRIVER, OPERATING METHOD THEREOF, MEMORY DEVICE INCLUDING CLOCK DRIVER, AND MEMORY SYSTEM

CROSS-REFERENCE TO RELATED APPLICATION

This application is based on and claims priority under 35 U.S.C. § 119 to Korean Patent Application No. 10-2023-0009259, filed on Jan. 25, 2023, in the Korean Intellectual Property Office, the disclosure of which is incorporated by reference herein in its entirety.

TECHNICAL FIELD

The present disclosure relates to a clock driver for a memory device, an operating method thereof, a memory device including the clock driver, and a memory system.

DISCUSSION OF RELATED ART

Semiconductor memories are widely used to store data in various electronic devices, such as computers, wireless communication devices, cameras, digital displays, and the like. Data is stored by programming various states of a semiconductor memory. To access the stored data, at least one stored state of the semiconductor memory may be read or sensed. To store data, components of a device may write or program the state of the semiconductor memory.

Various types of semiconductor memories exist. Dynamic random-access memory (DRAM) and a volatile memory may lose their stored states when external power thereto is disconnected. A memory device including a volatile memory and a clock buffer may buffer a clock signal received from a host and operate in response to the buffered clock signal.

When the host executes a clock interruption mode by setting a logic level of the clock signal to a continuous logic low, the volatile memory may enter a low power mode. However, a clock buffer may not have a separate pin for recognizing a clock interruption mode. In this case, because the volatile memory may not enter a low power mode, power consumption may unnecessarily increase.

SUMMARY

Embodiments may generate a chip enable signal for entering a memory device into a low power mode using a clock signal input from a clock buffer without an additional pin associated with the chip enable signal.

Embodiments provide a clock driver that outputs a chip enable signal by coupling differential clock signals; an operating method thereof; a memory device including the clock driver; and a memory system.

According to an aspect of the present disclosure, there is provided a clock driver comprising a differential buffer configured to output a differential amplified clock signal pair in which differential amplified clock signals thereof oscillate in phases opposite to each other during a clock operation period, and saturate to different respective levels during a clock interruption period, based on a differential external clock signal pair in which differential external clock signals oscillate in phases opposite to each other during the clock operation period and have a certain logic level during the clock interruption period, and a signal coupler configured to generate a differential internal clock signal pair in which differential internal clock signals thereof oscillate in phases opposite to each other to levels higher and lower than a first reference level during the clock operation period, and during the clock interruption period saturate to a level lower than the first reference level, based on the differential amplified clock signal pair, and output a chip enable signal to a memory chip based on the differential internal clock signal pair.

According to an aspect of the present disclosure, there is provided a method of operating a clock driver, the method comprising outputting a differential amplified clock signal pair having differential amplified clock signals that oscillate in phases opposite to each other during a clock operation period and saturate to different levels during a clock interruption period, based on a differential external clock signal pair having differential external clock signals that oscillate in phases opposite to each other during the clock operation period and have a specific logic level during the clock interruption period, generating a differential internal clock signal pair having differential internal clock signals that oscillate in phase opposite to each other to levels higher and lower than a first reference level during the clock operation period and saturate to a level lower than the first reference level during the clock interruption period based on the differential amplified clock signal pair, and providing a chip enable signal to a memory chip based on the differential internal clock signal pair.

According to an aspect of the present disclosure, there is provided a clock driver comprising a differential buffering circuit configured to receive a differential external clock signal pair and correspondingly output a differential amplified clock signal pair, and a signal coupling circuit configured to receive the differential amplified clock signal pair and correspondingly output a chip enable signal. The signal coupling circuit may be configured with a first filter connected to a terminal to which a true signal of the differential amplified clock signal pair is applied and a first node to which a true signal of a first differential internal clock signal pair is applied, a second filter connected to a terminal to which a complement signal of the differential amplified clock signal pair is applied and a second node to which a complement signal of the first differential internal clock signal pair is applied, a first differential comparator connected between the first node and a third node to which a true signal of a second differential internal clock signal pair is applied, a second differential comparator connected between the second node and a fourth node to which a complement signal of the second differential internal clock signal pair is applied, and an OR operation gate including input terminals connected to the third node and the fourth node, and an output terminal through which a chip enable signal is output.

According to an aspect of the present disclosure, there is provided a memory device comprising a memory chip configured to enable or disable according to a logic level of a chip enable signal, and a clock driver configured to output the chip enable signal from differential external clock signal pair in which the differential external clock signals oscillate in phases opposite to each other or have a specific logic level. The clock driver may be configured of a differential buffer configured to output a differential amplified clock signal pair having differential amplified clock signals that oscillate in phases opposite to each other during a clock operation period and saturate to different levels during a clock interruption period, based on the differential external clock signal pair, and a signal coupler configured to generate differential internal clock signals that oscillate in phases opposite to each other and to levels higher and lower than a first reference level during the clock operation period and saturate to a level lower than the first reference level during the clock interruption period, based on the differential amplified clock signal pair, and output the chip enable signal based on the differential internal clock signal pair.

According to an aspect of the present disclosure, there is provided a memory system comprising a memory controller configured to output a differential external clock signal pair having differential external clock signals that oscillate in phases opposite to each other during a clock operation period, and have a specific logic level during a clock interruption period; and a memory device as summarized above.

BRIEF DESCRIPTION OF THE DRAWINGS

Embodiments will be more clearly understood from the following detailed description taken in conjunction with the accompanying drawings in which.

DETAILED DESCRIPTION OF EMBODIMENTS

Hereinafter, embodiments will be described in detail with reference to the accompanying drawings.

Herein, when an element is first introduced by a name followed by a label, the element may later be referred to by a shortened version of the name followed by the label, or by just the label. For example, "first differential internal clock signal pair ICK" may be later referred to as "signal pair ICK"; "the chip enable signal CHIP_EN" may be later referred to as just "CHIP_EN"; etc.

Herein, a clock signal may be described as oscillating between high and low states during an operational period, and having a constant level during a clock interruption period.

Herein, "true" and "complement" differential clock signals of a differential clock signal pair may be said to "oscillate in phases opposite to each other". This means that during any given clock cycle (1/frequency of the clock oscillation), during approximately one half of the clock cycle, the true signal is at a high state and the complement signal is at a low state, and during approximately the other half of the clock cycle, the true signal is at the low state and the complement signal is at the high state.

Figure 1:
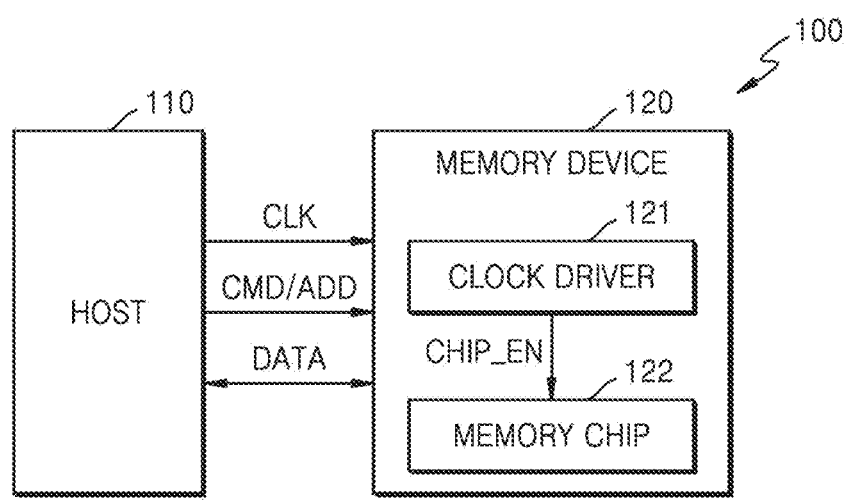
FIG. 1 is a block diagram illustrating a system according to embodiments.

FIG. 1 is a block diagram illustrating a system 100 according to embodiments.

The system 100 may include a host 110 and a memory device 120.

The host 110 may control the overall operation of the system 100. For example, the host 110 may control the memory device 120 to write data or read data.

The host 110 may issue or generate request signals for accessing the memory device 120. For example, the host 110 may generate commands/addresses CMD/ADD, a clock signal CLK, and data DATA to be stored in/read from the memory device 120 at times corresponding to edge transitions of the clock signal CLK. The command and address may be combined into a command/address signal. The command may include, for example, an active command, a pre-charge command, a read command, a write command, and/or a refresh command.

The clock signal CLK may be a differential clock signal pair having a "true" clock signal and a "complement" clock signal. To control the operation of the memory device 120 during an operational period ("clock operation period"), the host 110 may transmit the clock signal CLK to the memory device 120, where each of the true and complement signals of the clock signal CLK may oscillate between a high level state ("high state") and a low level state ("low state) at a constant frequency.

To stop the operation of the memory device 120 or to cause the memory device 120 to stand by, the host 110 may transmit the clock signal CLK with each of the true and complement signals thereof having the same, specific logic level to the memory device 120. Here, the specific logic level will be mainly exemplified as a logic low level, but a logic high level is also a possibility.

The memory device 120 may store data DATA and output the stored data DATA. The memory device 120 may be implemented as an unbuffered dual in-line memory module (UDIMM), a registered DIMM (RDIMM), a load reduced DIMM (LRDIMM), a fully buffered DIMM (FBDIMM), and a small outline DIMM (SODIMM).

The memory device 120 may include a clock driver 121 and a memory chip 122.

The clock driver 121 may function at least in part as a clock buffer to buffer the clock signal CLK. The clock driver 121 may generate a chip enable signal CHIP_EN from the clock signal CLK. The clock driver 121 may transmit the chip enable signal CHIP_EN to the memory chip 122. Although not illustrated in the figures, the clock signal CLK may also be directly routed to the memory chip 122 to facilitate reading/writing of data at timings correlated with edge transitions of the clock signal CLK.

The chip enable signal CHIP_EN may instruct the memory chip 122 to be enabled or disabled. To this end, the chip enable signal CHIP_EN may have a specific logic level. For example, when CHIP_EN is a logic high level ("logic high"), the memory chip 122 may be enabled, and when CHIP_EN is a logic low level ("logic low"), the memory chip 122 may be disabled, or vice versa in another design example. Hereinafter, it is assumed that when CHIP_EN is a logic high, the memory chip 122 is enabled, and when CHIP_EN is a logic low, the memory chip 122 is disabled.

When the clock signal CLK is oscillating, the clock driver 121 may transmit CHIP_EN having a logic high to the memory chip 122. During a clock interruption period, each of the true and complement signals of the clock signal CLK may have a specific logic level (e.g., a logic low) for a duration exceeding at least one clock cycle (a period exceeding at least 1/f, where f is the clock oscillation frequency), and the clock driver 121 may transmit CHIP_EN having a logic low to the memory chip 122.

The memory chip 122 may be implemented as a volatile memory, such as synchronous dynamic random access memory (SDRAM), double data rate SDRAM (DDR SDRAM), low power double data rate SDRAM (LPDDR SDRAM), graphics double data rate SDRAM (GDDR SDRAM), DDR2 SDRAM, DDR3 SDRAM, DDR4 SDRAM, DDR5 SDRAM, etc. When the memory chip 122 is implemented as DRAM, the memory chip 122 may be double data rate synchronous DRAM according to various standards (e.g., DDR to DDR5, LPDDR to LPDDR5, etc.).

The memory chip 122 may be enabled or disabled according to a logic level of CHIP_EN. When CHIP_EN has a logic high, the memory chip 122 may be enabled and may perform a normal operation. Here, the normal operation may include, for example, a read operation, a write operation, or a refresh operation. When CHIP_EN has a logic low, the memory chip 122 may be disabled and may perform a low-power operation or enter a low-power mode. Here, the low-power operation may be a standby operation without performing a normal operation.

As described above, the chip enable signal CHIP_EN to be provided to the memory chip 122 is generated using only the clock signal CLK input to the clock driver 121, thereby reducing power consumption and manufacturing cost.

Also, as described above, an external clock signal is used to generate CHIP_EN, without the use of an additional signal. Thus, in contrast to conventional circuits, a capacitance generated between input terminals to which the clock signal is input is reduced. Accordingly, there is an effect of increasing a margin of signal integrity (SI).

Figure 2:
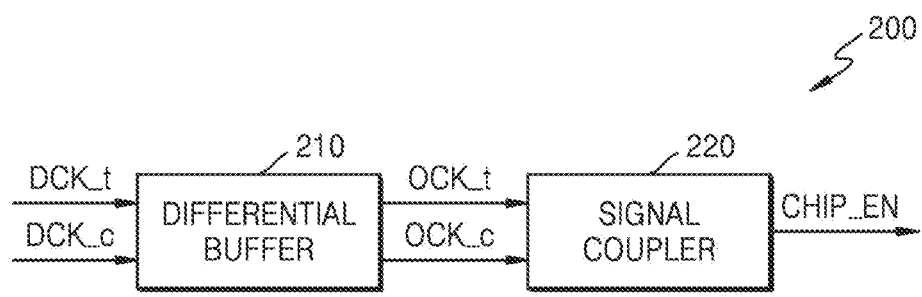
FIG. 2 is a block diagram illustrating a clock driver according to embodiments.

FIG. 2 is a block diagram illustrating a clock driver 200 according to embodiments.

Referring to FIG. 2, the clock driver 200 may correspond to the clock driver 121 of FIG. 1. The clock driver 200 may output CHIP_EN from a differential external clock signal pair DCK comprising a true signal DCK_t and a complement signal DCK_c.

The differential external clock signal pair DCK may correspond to the clock signal CLK of FIG. 1. DCK_t and DCK_c may oscillate in phases opposite to each other during a clock operation period, and may each have a constant logic level (e.g., the same level) during a clock interruption period. DCK_t and DCK_c may oscillate in phases opposite to each other during the clock operation period to enable the memory chip 122. During the clock interruption period, both DCK_t and DCK_c may have a specific logic level (e.g., a logic low) to disable the memory chip 122.

The clock driver 200 may include a differential buffer 210 and a signal coupler 220.

The differential buffer 210 may output a differential amplified clock signal pair OCK, comprising a true signal OCK_t and a complement signal OCK_c, based on the differential external clock signal pair DCK. The differential buffer 210 may be referred to as a high frequency comparator.

When DCK_t and DCK_c oscillate in phases opposite to each other, OCK_t and OCK_c may oscillate in phases opposite to each other. When levels of DCK_t and DCK_c are both a specific logic level (e.g., a logic low), OCK_t may saturate to a first level and OCK_c may saturate to a second level different from the first level. In this case, the first level may be lower than the second level, or vice versa, according to respective embodiments.

The physical size of the differential buffer 210 may be greater than that of the signal coupler 220. In this case, CHIP_EN is generated using the relatively small size of the signal coupler 220, whereby the clock driver 200 may be advantageously integrated in a small size and manufacturing costs of the clock driver 200 may be reduced relative to prior art clock drivers.

The signal coupler 220 may output CHIP_EN based on the differential amplified clock signal pair OCK.

The signal coupler 220 may generate a differential internal clock signal pair (not shown) based on the differential amplified clock signal pair OCK. Also, CHIP_EN may be output based on the differential internal clock signal pair.

Signals OCK_t and OCK_c may oscillate in phases opposite to each other, and to levels higher and lower than a first reference level during a clock operation period. During a clock interruption period, OCK_t and OCK_c may saturate to different respective levels higher and lower than the first reference level. An example of the first reference level and an example of the differential internal clock signal pair are described later with reference to FIGS. 5, 7, and 8.

As described above, because CHIP_EN is generated by using the differential amplified clock signal pair OCK, there is an advantage of reducing capacitance generated at the input terminals of the differential buffer 210 and increasing the signal integrity (SI) margin accordingly.

Figure 3:
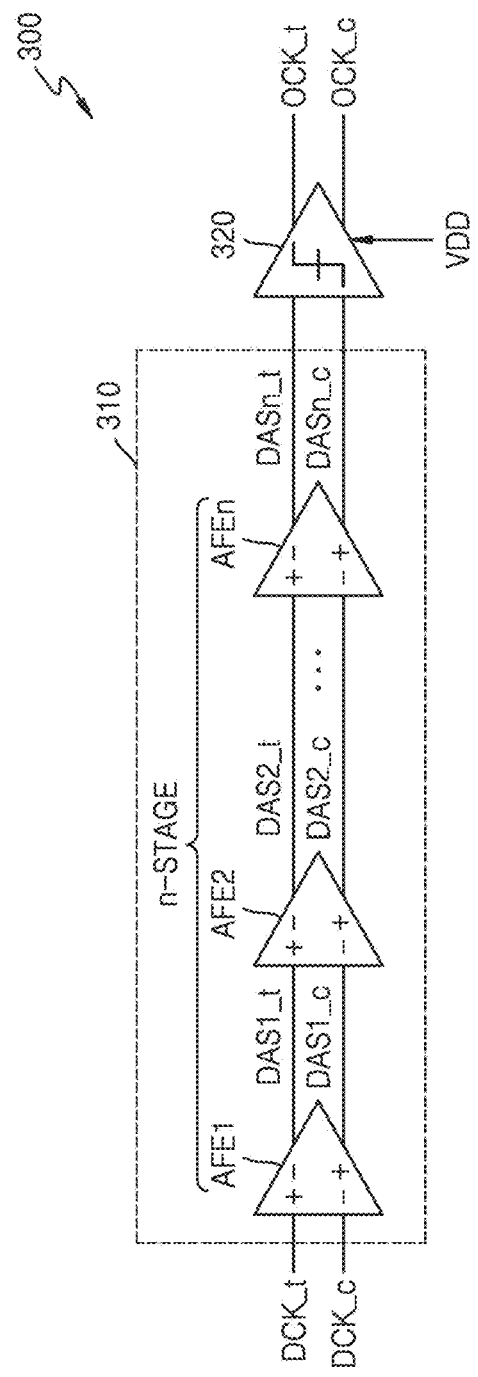
FIG. 3 is a circuit diagram illustrating a differential buffer according to embodiments.

FIG. 3 is a circuit diagram illustrating a differential buffer 300 according to embodiments.

Referring to FIG. 3, the differential buffer 300 may correspond to the differential buffer 210 of FIG. 2. The differential buffer 300, as a differential buffering circuit, may be configured to output the differential amplified clock signal pair OCK composed of the true signal OCK_t and the complement signal OCK_c. The differential buffer 300 may include an amplifier group (interchangeably, "analog front end group") 310 and a differential comparator 320.

The amplifier group 310 may amplify the oscillating differential external clock signal pair DCK (comprising DCK_t and DCK_c) and output a differential amplified signal pair (e.g., DAS1_t and DAS1_c, DAS2_t and DAS2_c, or DASn_t and DASn_c). The amplifier group 310 may include at least one amplifier. For example, the amplifier group 310 may include n amplifiers AFE1, AFE2, and AFEn. The n amplifiers AFE1, AFE2, and AFEn may be configured as n-stages connected in series or cascade (n is a natural number greater than or equal to 1). An output signal output from an amplifier of a previous stage may be input to an amplifier of a next stage. Each amplifier may have two input terminals and two output terminals. For example, the first amplifier AFE1 may include two input terminals through which DCK_t and DCK_c are input, and two output terminals through which the first differential amplified signal pair DAS1_t and DAS1_c is output. Each amplifier may amplify a pair of input signals and output a differential output signal pair. For example, the first amplifier AFE1 may amplify the differential external clock signal pair DCK (comprising DCK_t and DCK_c) and output the first differential amplified signal pair DAS1_t and DAS1_c. The second amplifier AFE2 may amplify the first differential amplified signal pair DAS1_t and DAS1_c and output a second differential amplified signal pair DAS2_t and DAS2_c. An $n^{th}$ differential amplified signal pair DASn_t and DASn_c output from the $n^{th}$ amplifier AFEn may be input to the differential comparator 320. Each differential amplified signal pair may include a true signal and a complement signal. As the number of amplifiers increases, there is an advantage in that relatively low-level input signals may be amplified at higher gain. As the number of amplifiers decreases, power consumption of the amplifier group 310 may be reduced.

Meanwhile, during the clock interruption period, DCK having a specific logic level (e.g., a logic low) may be input to the amplifier group 310. In this case, the amplifier group 310 may not output a final differential amplified signal pair (e.g., the $n^{th}$ differential amplified signal pair DASn_t and DASn_c) at a specific logic level (e.g., a logic low).

The differential comparator 320 may include two input terminals connected to the final output terminals of the amplifier group 310 and two output terminals from which the differential amplified clock signal pair OCK (comprising OCK_t and OCK_c) is output. The differential comparator 320 may be implemented as a CML to CMOS converter but is not limited thereto.

The differential comparator 320 may compare the differential amplified signal pair with a second reference level that is lower than the first reference level. For example, with reference to FIG. 3, the differential comparator 320 compares a true signal DASn_t of the $n^{th}$ differential amplified signal pair DASn_t and DASn_c with the second reference level and compares a complement signal DASn_c of the $n^{th}$ differential amplified signal pair with the second reference level.

The differential comparator 320 may output comparison results as the above-discussed differential amplified clock signal pair OCK (comprising OCK_t and OCK_c). For example, if the level of the true signal DASn_t of the $n^{th}$ differential amplified signal pair DASn_t and DASn_c equals or exceeds the second reference level, OCK_t may be a logic high; and if DASn_t is lower than the second reference level, OCK_t may be a logic low. The complement signal DASn_c of the $n^{th}$ differential amplified signal pair DASn_t and DASn_c is similar to the above example but may have a phase opposite to that of DASn_t. The relationship between OCK_c and DASn_c may be the same as the above relationship between OCK_t and DAS_n_t.

The second reference level may be determined according to a supply voltage VDD input to the differential comparator 320. In one example, the second reference level is one half (0.5 VDD) of the supply voltage VDD.

When DCK having a specific logic level (e.g., a logic low, and both DCK_1 and DCK_c are logic low) is input to the differential buffer 300, the differential comparator 320 may output OCK_t converging to a first level and may output OCK_c converging to a second level. For example, referring momentarily to FIG. 8, during a clock interruption period "tDLW" during which each of DCK_t and DCK_c is at logic low, OCK_t converges to a low level and OCK_c converges to a high level.

Figure 4:
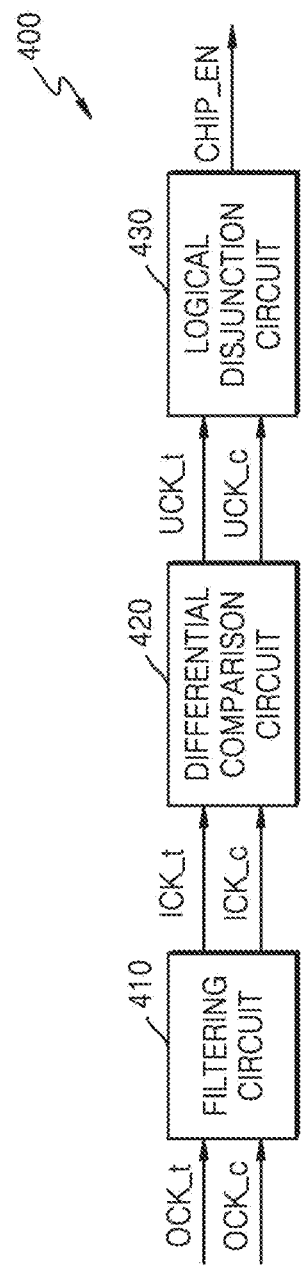
FIG. 4 is a block diagram illustrating a signal coupler according to exemplary embodiments of the present disclosure.

FIG. 4 is a block diagram illustrating a signal coupler 400 according to embodiments.

Referring to FIG. 4, the signal coupler 400 may correspond to the signal coupler 220 of FIG. 2. The signal coupler 400 may include a filtering circuit 410, a differential comparison circuit 420, and a logical disjunction circuit 430.

The filtering circuit 410 may output a first differential internal clock signal pair ICK, comprising a true signal ICK_t and a complement signal ICK_c, by filtering the differential amplified clock signal pair OCK (comprising OCK_t and OCK_c). ICK_t and ICK_c may each oscillate to levels higher and lower than the first reference level during a clock operation period (e.g., "Operation" period of FIG. 8), and each saturate to a level lower than the first reference level during a clock interruption period (see, e.g., FIG. 8—each of ICK_t and ICK_c converges to a level lower than a first reference level Vth1 during a clock interruption period tDLW).

Figure 8:
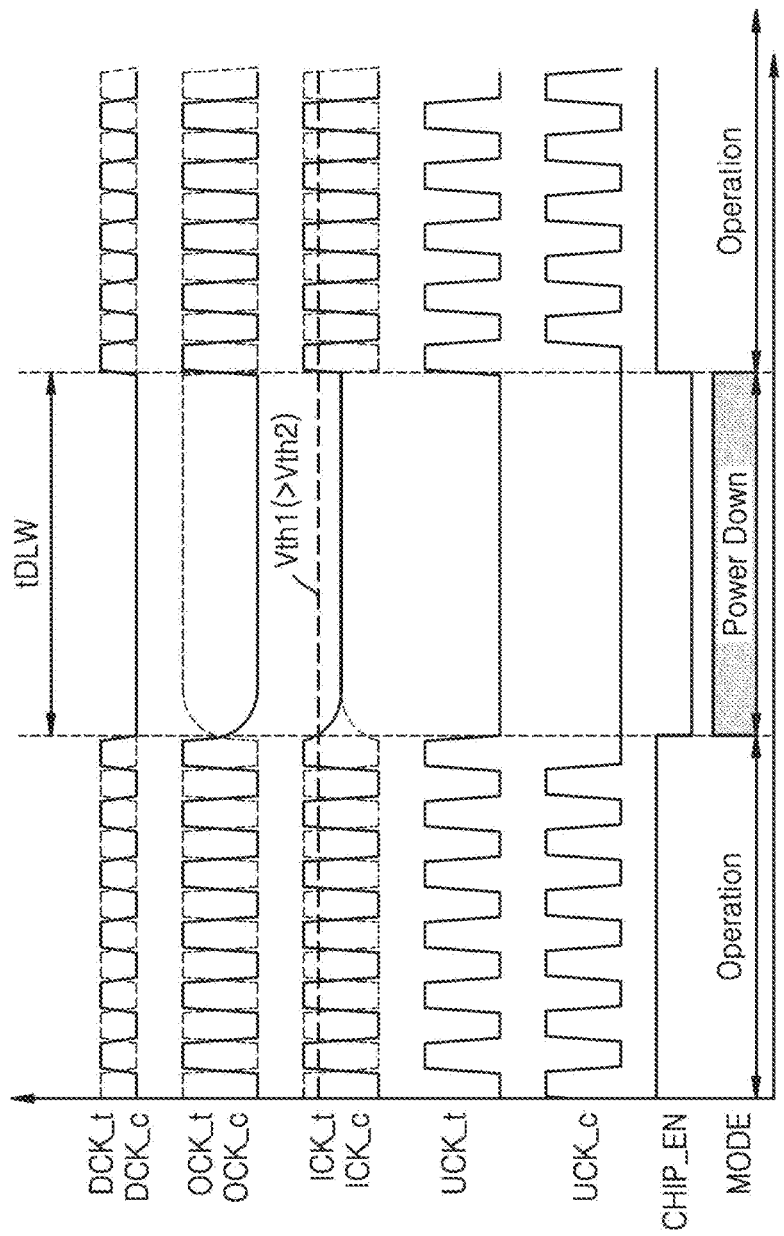
FIG. 8 is a timing diagram of signals according to embodiments.

The differential comparison circuit 420 may compare the first differential internal clock signal pair ICK with the first reference level. To this end, the differential comparison circuit 420 may compare each of ICK_t and ICK_c with the first reference level. The differential comparison circuit 420 may output comparison results as a second differential internal clock signal pair UCK comprising a true signal UCK_t and a complement signal UCK_c. As illustrated in FIG. 8, during the clock operation period, UCK_t and UCK_c may oscillate in phases opposite to each other, and higher and lower than the first reference level; and during the clock interruption period each may have a level lower than the first reference level (e.g., a logic low).

The logical disjunction circuit 430 may perform an OR operation on the second differential internal clock signal pair UCK. For example, the logical disjunction circuit 430 may receive a logic level of the true signal UCK_t and a logic level of the complement signal UCK_c and perform an OR operation for the logic levels of the respective signals. The logical disjunction circuit 430 may output an OR operation result as CHIP_EN. A result of the OR operation may be a logic high when any one of the input signals is a logic high. The result of the OR operation may be a logic low when all logic levels of input signals are logic low.

As described above, when a relatively small size of the signal coupler 400 is used to generate a chip enable signal, there is an advantage to integration of devices.

Figure 5:
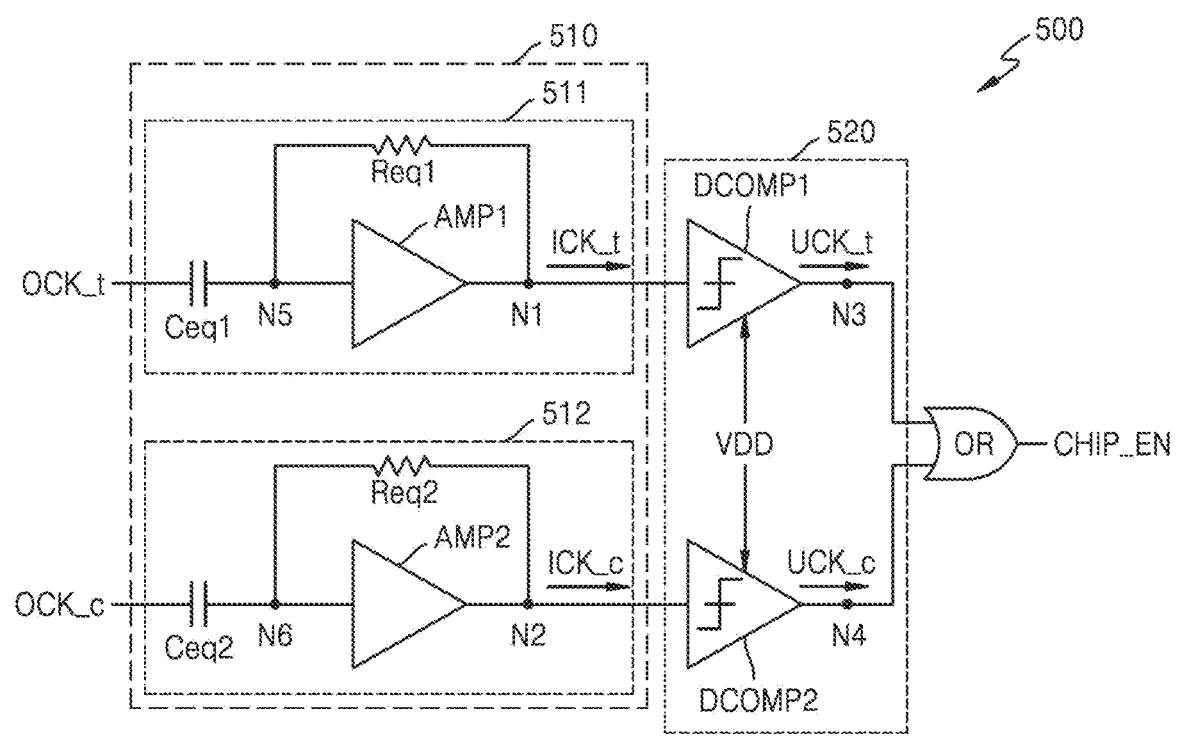
FIG. 5 is a circuit diagram illustrating a signal coupler according to embodiments.

FIG. 5 is a circuit diagram illustrating a signal coupler 500 according to embodiments.

Referring to FIG. 5, the signal coupler 500 may correspond to both the signal coupler 220 of FIG. 2 and the signal coupler 400 of FIG. 4. The signal coupler 500, as a signal coupling circuit, may be configured to receive a differential amplified clock signal pair OCK (comprising signals OCK_t and OCK_c) and output CHIP_EN. The signal coupler 500 may include a filtering circuit 510, a differential comparison circuit 520, and an OR operation gate 530.

The filtering circuit 510 may include a first filter 511 and a second filter 512, which may be high pass filters. In one embodiment, a high pass filter may include a capacitor, a resistor, and an amplifier.

The first filter 511 may receive the true signal OCK_t and output the true signal ICK_t. The first filter 511 may be connected to a terminal to which the true signal OCK_t is applied and to a first node N1 to which the true signal ICK_t is applied.

The first filter 511 may include a first equivalent capacitor Ceq1, a first equivalent resistor Req1, and a first amplifier AMP1.

The first equivalent capacitor Ceq1 may be a first capacitor group including at least one capacitor. The first equivalent capacitor Ceq1 may be connected between a terminal to which OCK_t is applied and a fifth node N5. When the number of capacitors is two or more, the capacitors may be connected in series. As the number of capacitors connected in series increases, a value (e.g., capacitance) of an equivalent capacitor may decrease.

The first equivalent resistor Req1 may be a first resistor group including at least one resistor. The first equivalent resistor Req1 may be connected between the fifth node N5 and the first node N1. When the number of resistors is two or more, the resistors may be connected in parallel between the fifth node N5 and the first node N1. As the number of resistors connected in parallel increases, a value of equivalent resistance (e.g., resistance) may decrease.

The first amplifier AMP1 may include an input terminal connected to the fifth node N5 and an output terminal connected to the first node N1.

The second filter 512 may receive OCK_c and output ICK_c. The second filter 512 may be connected to a terminal to which OCK_c is applied and a second node N2 to which ICK_c is applied.

The second filter 512 may include a second equivalent capacitor Ceq2, a second equivalent resistor Req2, and a second amplifier AMP2.

The second equivalent capacitor Ceq2 may be a second capacitor group including at least one capacitor. The second equivalent capacitor Ceq2 may be connected between a terminal to which OCK_c is applied and a sixth node N6. The second equivalent capacitor Ceq2 may be implemented with two or more capacitors connected in series.

The second equivalent resistor Req2 may be a second resistor group including at least one resistor. The second equivalent resistor Req2 may be connected between the sixth node N6 and the second node N2. Two or more resistors may be connected in parallel between the sixth node N6 and the second node N2.

The second amplifier AMP2 may include an input terminal connected to the sixth node N6 and an output terminal connected to the second node N2.

When each of the first and second filters 511 and 512 includes an equivalent capacitor, an equivalent resistor, and an amplifier according to some embodiments, the Laplace relational expression for the input and output of the first and second filters 511 and 512 may be as defined in [Equation 1] below.

$$\frac{\text{OUT }(s)}{\text{INPUT }(s)} = -sC_{eq}R_{eq} \qquad \text{[Equation 1]}$$

A level of the first differential internal clock signal pair ICK (comprising ICK_t, ICK_c) may be determined according to a gain (e.g., "Ceq*Req"). When a value of the equivalent capacitor decreases, ICK may decrease. Also, when a value of the equivalent resistance decreases, ICK may decrease. Accordingly, because ICK may be lower than the first reference level, when DCK has a specific logic level, there is an advantage in that CHIP_EN is reduced to a logic low.

The differential comparison circuit 520 may include a first differential comparator DCOMP1 and a second differential comparator DCOMP2. The first differential comparator DCOMP1 and the second differential comparator DCOMP2 may also be referred to as slicers.

The first differential comparator DCOMP1 may be connected between the first node N1 and a third node N3. At the third node N3, the true signal UCK_t of the second differential internal clock signal pair UCK may be applied. The first differential comparator DCOMP1 may compare ICK_t with the first reference level. The first differential comparator DCOMP1 may output UCK_t.

When ICK_t is higher than the first reference level, UCK_t may be a logic high. When ICK_t is lower than the first reference level, UCK_t may be a logic low.

The second differential comparator DCOMP2 may be connected between the second node N2 and a fourth node N4. At the fourth node N4, UCK_c may be applied. The second differential comparator DCOMP2 may compare ICK_c with the first reference level. The second differential comparator DCOMP2 may output UCK_c.

When ICK_c is higher than the first reference level, UCK_c may be a logic high. When ICK_c is lower than the first reference level, UCK_c may be a logic low.

The first reference level may be determined according to a supply voltage VDD input to the first and second differential comparators DCOMP1 and DCOMP2. The first reference level may be higher than the second reference level (e.g., 0.5 VDD) and lower than the supply voltage VDD. For example, the first reference level may be in a range from about 0.7 VDD to about 0.8 VDD. However, the first reference level is not limited thereto.

The OR operation gate 530 may include input terminals connected to the third node N3 and the fourth node N4 and an output terminal to which CHIP_EN is output. The OR operation gate 530 may also be referred to as an OR gate.

Figure 6:
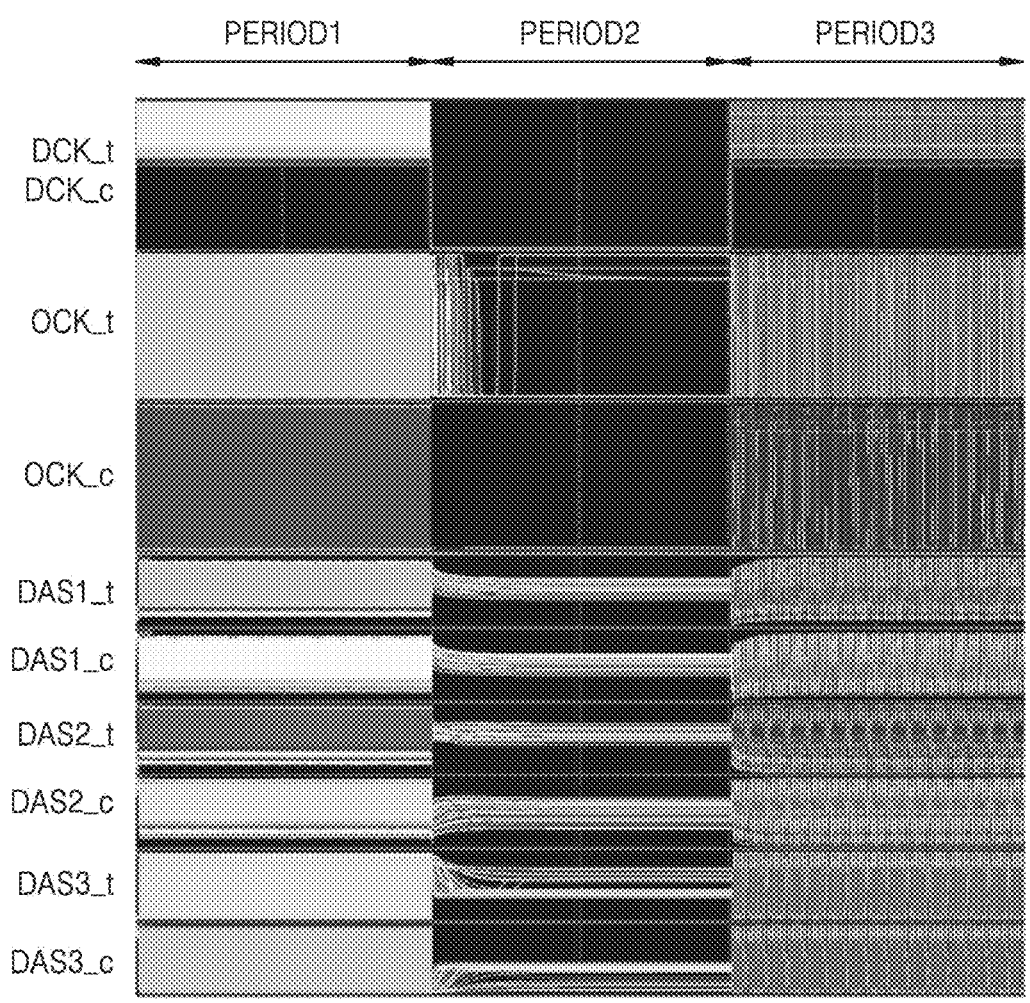
FIG. 6 is a diagram illustrating simulation waveforms of differential external clock signals, differential amplified clock signals, and differential amplified signals according to embodiments.

FIG. 6 is a diagram illustrating simulated waveforms of differential external clock signals, differential amplified clock signals, and differential amplified signals according to embodiments. In FIG. 6, it is assumed that the amplifier group 310 of FIG. 3 is configured with three amplifier stages. In addition, waveforms of each signal shown in FIG. 6 are simulation results repeatedly performed.

Referring to FIGS. 1, 3, and 6, during a first period PERIOD1, the differential external clock signal pair DCK may oscillate. In this case, the first differential amplified signal pair DAS1_t and DAS1_c, the second differential amplified signal pair DAS2_t and DAS2_c, and the third differential amplified signal pair DAS3_t and DAS3_c may also oscillate.

During a second period PERIOD2, the levels of the differential external clock signal pair DCK (the levels of each of DCK_t and DCK_c) may be a logic low. Levels of the first differential amplified signal pairs DAS1_t and DAS1_c may decrease from a level at the end of the first period PERIOD1 and saturate to a specific level. In this case, the saturation level and timing may be different for each differential signal of the first differential amplified signal pairs DAS1_t and DAS1_c. Levels of the true signals DAS2_t of the second differential amplified signal pair DAS2_t and DAS2_c may also saturate to a relatively low level. Levels of the complement signals DAS2_c of the second differential amplified signal pair DAS2_t and DAS2_c may increase from the level at the end of the first period PERIOD1 and saturate to a specific level. In this case, the convergence level and timing may be different for each complement signal DAS2_c. Levels of the true signals DAS3_t of the third differential amplified signal pair DAS3_t and DAS3_c may decrease from a level at the end of the first period PERIOD1 and saturate to a specific level. At this time, the convergence level and timing may be different for each true signal DAS3_t. Levels of the complement signals DAS3_c of the third differential amplified signal pair DAS3_t and DAS3_c may increase from a level at the end of the first period PERIOD1 and saturate to a specific level. At this time, the convergence level and timing may be different for each complement signal DAS3_c.

In the second period PERIOD2, because the level and timing of a final differential amplified signal (e.g., a third differential amplified signal pair DAS3_t and DAS3_c) are different for each signal, the true signal OCK_t of the differential amplified clock signal pair OCK may ripple at the beginning of the second period PERIOD2. Therefore, a signal converging at the same level and timing may be required.

During a third period PERIOD3, when the differential external clock signal pairs DCK oscillate, the plurality of differential amplified signal pairs DAS1_t. DAS1_c, DAS2_t, DAS2_c. DAS3_t, and DAS3_c may oscillate.

Figure 7:
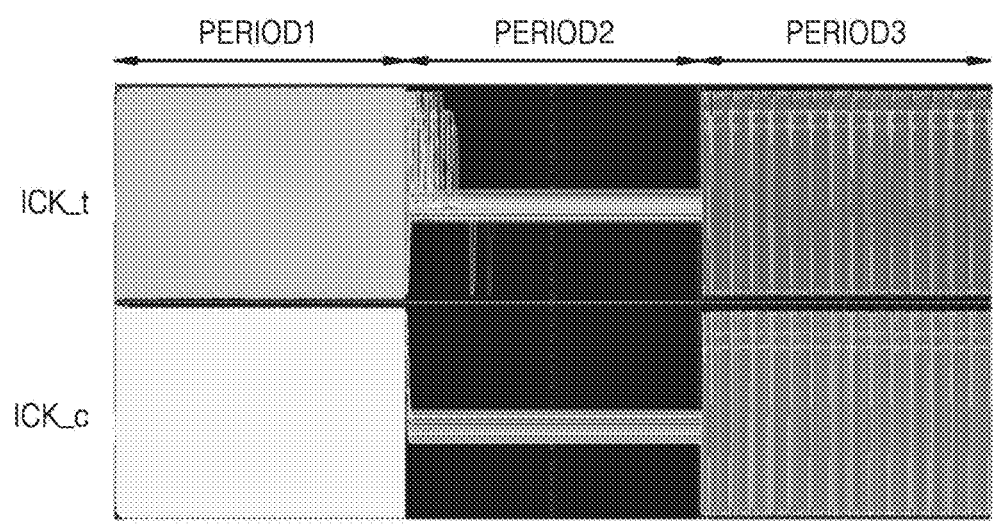
FIG. 7 is a diagram illustrating simulation waveforms of differential internal clock signals according to embodiments.

FIG. 7 is a diagram illustrating simulation waveforms of differential internal clock signals according to embodiments. Waveforms of each signal shown in FIG. 7 are simulation results repeatedly performed.

Referring to FIGS. 6 and 7, when DCK oscillates (each of DCK_t and DCK_c oscillates) during the first period PERIOD1, ICK_t and ICK_c may also oscillate.

During the second period PERIOD2, when DCK is a logic low (DCK_t and DCK_c are each a logic low), ICK_t and ICK_c may ripple at the beginning of the second period PERIOD2, but the levels at which ICK_t and ICK_c saturate may be substantially the same. Furthermore, ICK_t and ICK_c may saturate to almost the same level simultaneously.

During the third period PERIOD3, similar to the first period PERIOD1, when the differential external clock signal pairs DCK oscillates, ICK_t and ICK_c may also oscillate.

FIG. 8 is a timing diagram of signals according to embodiments.

Referring to FIGS. 1 and 8, during a clock operation period ("Operation" period in FIG. 8) the differential external clock signal pair DCK (each of DCK_t and DCK_c) may oscillate. Other differential signal pairs OCK_t, OCK_c, ICK_t, ICK_c, UCK_t, and UCK_c may also oscillate. The logic level of CHIP_EN is a first logic level, for example, a logic high, and the memory chip 122 may be enabled to enter an operation mode (e.g., "Operation" in FIG. 8).

Each of DCK_t and DCK_c may be a logic low for a certain time period tDLW (a clock interruption period following the Operation period). OCK_t and OCK_c may saturate to different levels during the period tDLW. Here, OCK_t may saturate to a first level as indicated by the solid line, and OCK_c may saturate to a second level higher than the first level as indicated by the dashed line. Note that in another embodiment, the first level is higher than the second level. During the time period tDLW, ICK_t and ICK_c may each saturate to a level lower than a first reference level Vth1. The first reference level Vth1 may be set in the differential comparison circuit 520. The first reference level Vth1 may be higher than a second reference level Vth2. During the time period tDLW, each of UCK_t and UCK_c may be a logic low; CHIP_EN may be a logic low, whereby the memory chip 122 is disabled and may enter a low power mode (e.g., "Power Down" in FIG. 8).

After the clock interruption period tDLW, the Operation period may resume and DCK may oscillate again. In this period, CHIP_EN is a first logic level, for example, a logic high, and the memory chip 122 is enabled and enter an operation mode.

Figure 9:
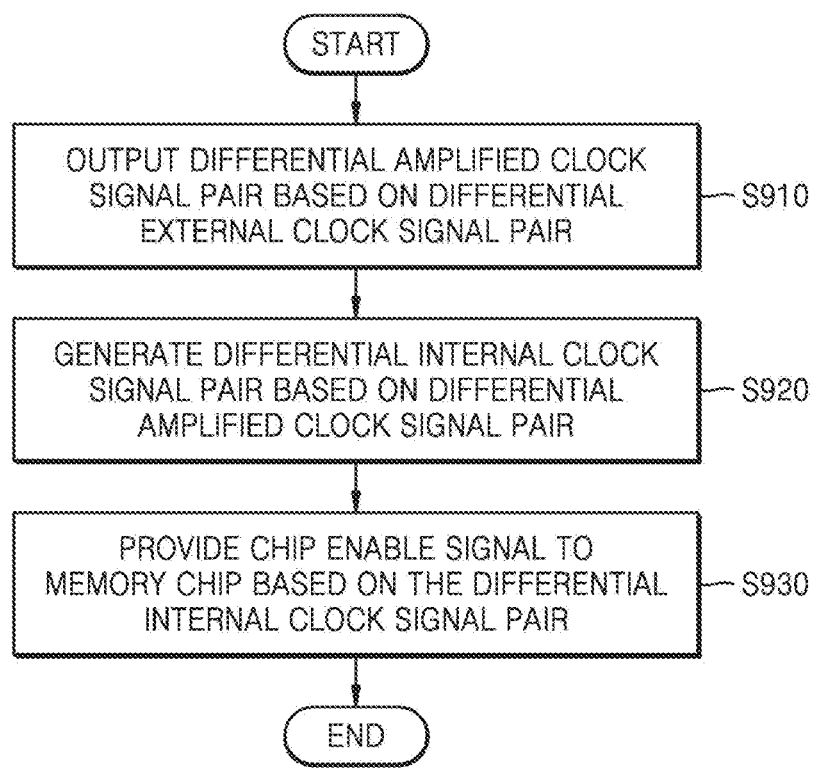
FIG. 9 is a flowchart of an operating method of a clock driver according to embodiments.

FIG. 9 is a flowchart of an operating method of a clock driver according to embodiments.

Referring to FIGS. 2 and 9, operation S910 of outputting a differential amplified clock signal pair OCK during a clock operation period is performed based on the differential external clock signal pair DCK_t and DCK_c. During this period, DCK_t and DCK_c, may oscillate in phases opposite to each other. During a clock interruption period, the differential external clock signal pair DCK_t and DCK_c may have a specific logic level (e.g., a logic low). A pair of differential amplified clock signals OCK_t and OCK_c may oscillate in phases opposite to each other during the clock operation period. During the clock interruption period, OCK_t and OCK_c may saturate to different levels from each other. Operation S910 may be performed by the differential buffer 210 of FIG. 2.

Operation S920 of generating a differential internal clock signal pair may be performed based on the differential amplified clock signal pair OCK_t and OCK_c. The differential internal clock signal pair may oscillate in phases opposite to each other above or below a first reference level. During the clock interruption period, the differential internal clock signal pair may each saturate to a level lower than the first reference level. The differential internal clock signal pair may include a first differential internal clock signal pair ICK_t and ICK_c and/or a second differential internal clock signal pair UCK_t and UCK_c. Operation S920 may be performed by the signal coupler 220 of FIG. 2.

Operation S930 of providing CHIP_EN to the memory chip is performed based on the differential internal clock signal pair. Operation S930 may be performed by the signal coupler 220 of FIG. 2.

As described above, by generating a chip enable signal using only a clock signal input from an external source, benefits of reducing power consumption, reducing manufacturing costs, and increasing SI margins may be realized.

Figure 10:
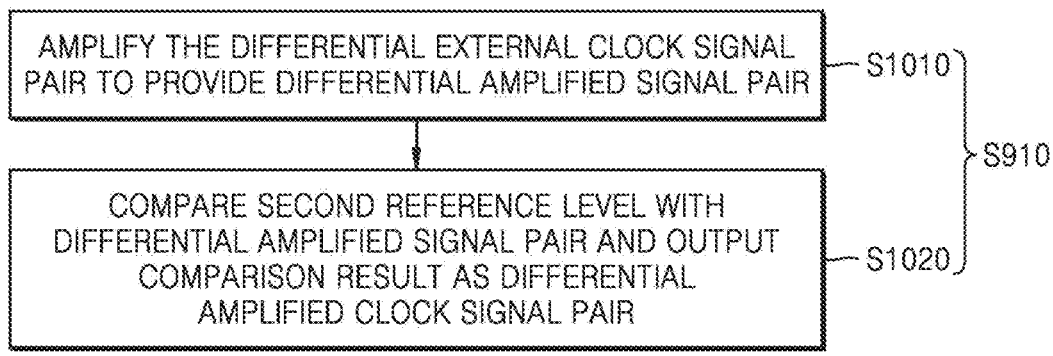
FIG. 10 is a flowchart explaining embodiments of operation S910 of FIG. 9.

FIG. 10 is a flowchart illustrating embodiments of operation S910 of FIG. 9.

Referring to FIGS. 3 and 10, operation S1010 of amplifying a differential external clock signal pair DCK_t and DCK_c to provide a differential amplified signal pair is performed. Operation S1010 may be performed by the amplifier group 310 of FIG. 3.

Operation S1020 of comparing a second reference level with the differential amplified signal pair and outputting a comparison result as a differential amplified clock signal pair OCK_t and OCK_c is performed. Operation S1020 may be performed by the differential comparator 320 of FIG. 3.

Figure 11:
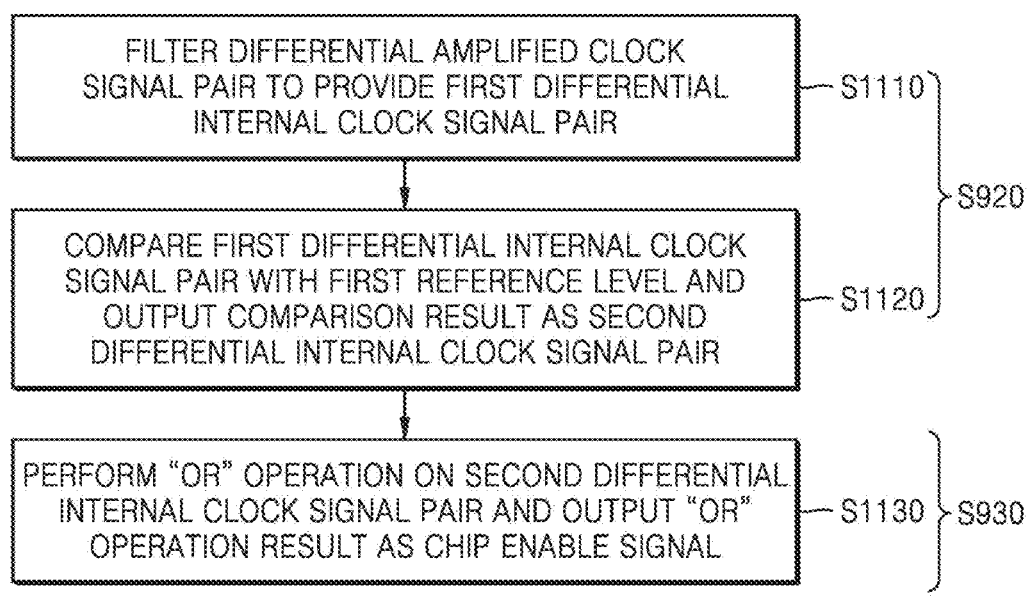
FIG. 11 is a flowchart for explaining embodiments of operations S920 and S930 of FIG. 9.

FIG. 11 is a flowchart for explaining embodiments of operations S920 and S930 of FIG. 9.

Referring to FIGS. 4 and 11, in operation S920, operation S1110 of outputting a first differential internal clock signal pair ICK_t, ICK_c is performed by filtering the differential amplified clock signal pair OCK_t, OCK_c. Operation S1110 may be performed by the filtering circuit 410 of FIG. 4.

In operation S920, operation S1120 of comparing the first differential internal clock signal pair ICK_t and ICK_c with the first reference level and outputting a comparison result as a second differential internal clock signal pair UCK_t and UCK_c is performed. Operation S1120 may be performed by the differential comparison circuit 420 of FIG. 4.

In operation S930, operation S1130 of performing an OR operation on the second differential internal clock signal pair UCK_t and UCK_c and outputting an OR operation result as CHIP_EN is performed. Operation S1130 may be performed by the logical disjunction circuit 430 of FIG. 4.

Figure 12:
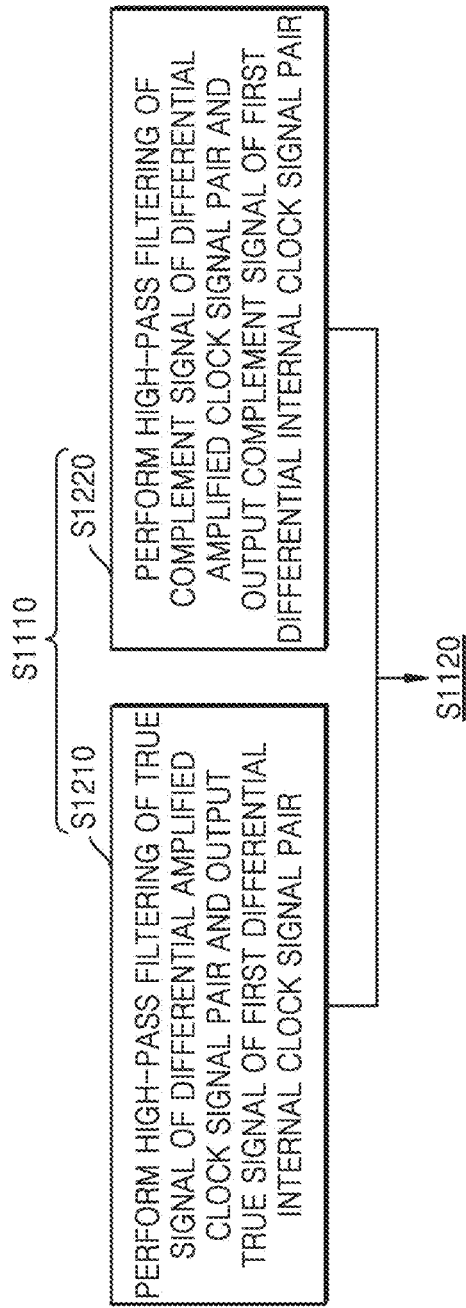
FIG. 12 is a flowchart for explaining embodiments of operation S1110 of FIG. 11.

FIG. 12 is a flowchart for explaining embodiments of operation S1110 of FIG. 11.

Referring to FIGS. 5 and 12, in operation S1110, operation S1210 of high-pass filtering a true signal OCK_t of the differential amplified clock signal pair OCK_t and OCK_c and outputting a true signal ICK_t of the first differential internal clock signal pair ICK_t and ICK_c is performed. Operation S1210 may be performed by the first filter 511 of FIG. 5.

In operation S1110, operation S1220 of high-pass filtering a complement signal OCK_c of the differential amplified clock signal pair OCK_t and OCK_c and outputting a complement signal ICK_c of the first differential internal clock signal pair ICK_t and ICK_c is performed. Operation S1220 may be performed by the second filter 512 of FIG. 5.

Figure 13:
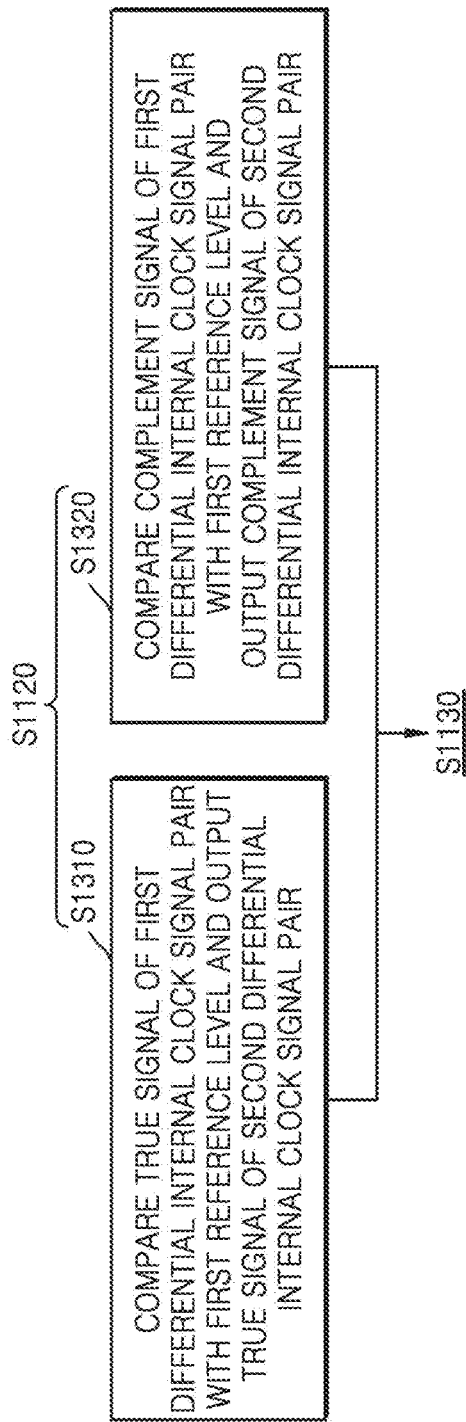
FIG. 13 is a flowchart for explaining embodiments of operation S1120 of FIG. 11.

FIG. 13 is a flowchart for explaining embodiments of operation S1120 of FIG. 11.

Referring to FIGS. 5 and 13, in operation S1120, operation S1310 of comparing a true signal ICK_t of the first differential internal clock signal pair ICK_t and ICK_c with the first reference level, and outputting a true signal UCK_t of the second differential internal clock signal pair UCK_t and UCK_c is performed. Operation S1310 may be performed by the first differential comparator DCOMP1 of FIG. 5.

In operation S1120, operation S1320 of comparing a complement signal ICK_c of the first differential internal clock signal pair ICK_t and ICK_c with the first reference level, and outputting a complement signal UCK_c of the second differential internal clock signal pair UCK_t and UCK_c is performed. Operation S1320 may be performed by the second differential comparator DCOMP2 of FIG. 5.

Figure 14:
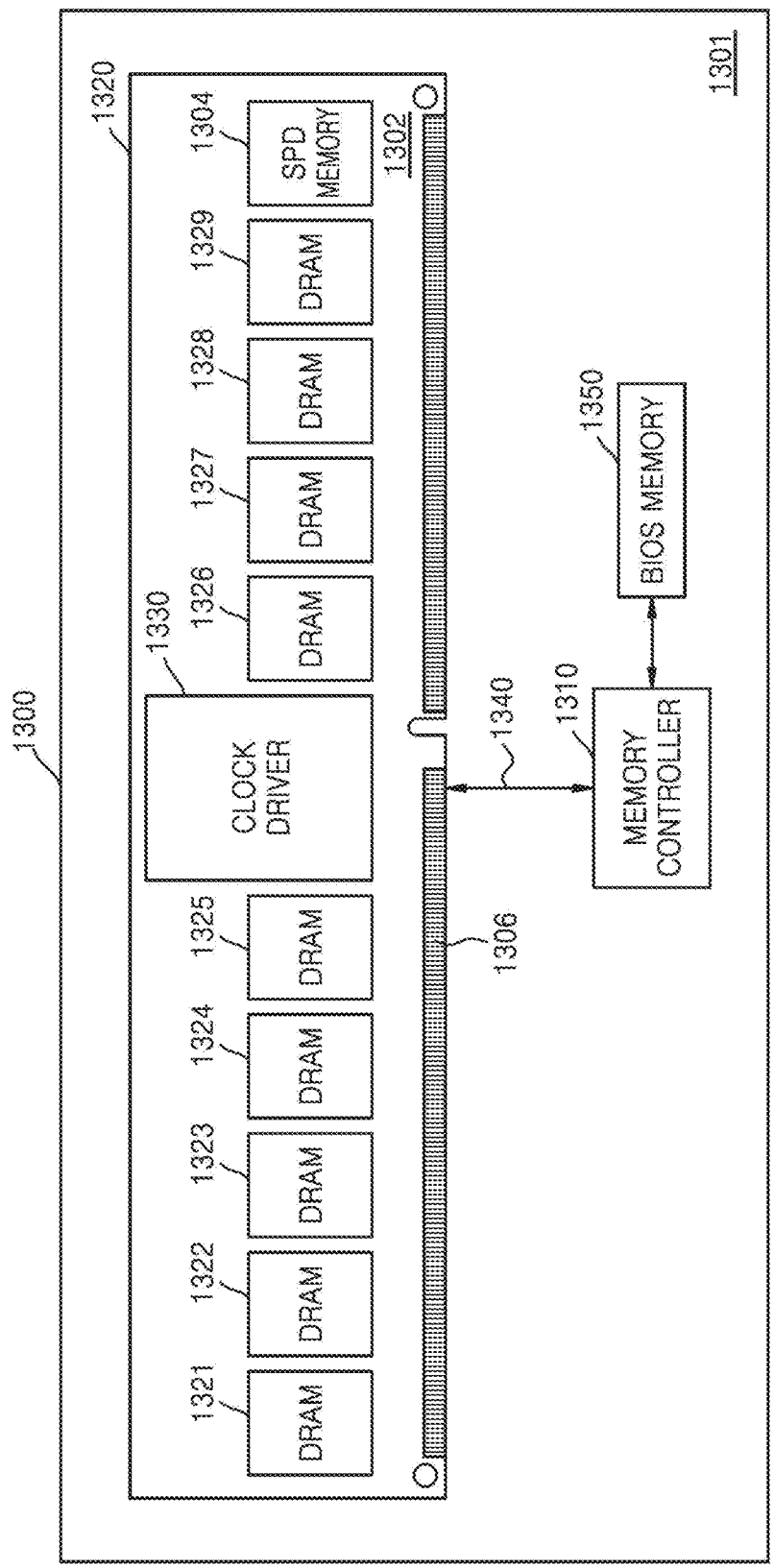
FIG. 14 is a diagram for describing a memory system according to embodiments.

FIG. 14 is a diagram for describing a memory system 1300 according to embodiments.

Referring to FIG. 14, the memory system 1300 may include a memory controller 1310 mounted on a board 1301, a memory module 1320, and a basic input/output system (BIOS) memory 1350.

The memory controller 1310 may be communicatively connected to the memory module 1320 through a memory bus 1340.

The memory controller 1310 may operate as a functional block that performs general computer operations within the memory system 1300. The memory controller 1310 may be included in a central processing unit (CPU) or the like.

The memory controller 1310 may be configured to execute one or more machine-executable instructions or pieces of software, firmware, or a combination thereof. The memory controller 1310 may be connected to the BIOS memory 1350 through various interfaces, such as a serial peripheral interface or a low pin count bus.

The BIOS memory 1350 may store BIOS code for booting the memory system 1300. The BIOS memory 1350 may be implemented as a non-volatile memory device, such as flash memory. The BIOS code is POST code and/or a part of the POST code for detecting hardware of the memory system 1300, such as the board 1301, the memory module 1320, a keyboard, and a disk drive, and checking whether they operate normally. The BIOS code may include memory reference code (MRC) for initialization of the memory module 1320. The MRC may include various algorithms configured to allow the memory controller 1310 to normally interoperate with the memory module 1320. The MRC may be executed by the memory controller 1310.

By the MRC, serial presence detect (SPD) data stored in an SPD memory device 1304 of the memory module 1320 may be read through the memory bus 1340, and the frequency, timing, driving, and detailed operation parameters for controlling the memory module 1320 may be set using the SPD data. The SPD data may include the type of memory module 1320, the type of memory device included in the memory module 1320, operation timing information, manufacturing information, revision code, a serial number, and the like. A built-in self test (BIST) and/or memory training of the memory module 1320 may be performed by the MRC code.

The memory controller 1310 may transmit clock signals, commands, and addresses to the memory module 1320, like the host 110 of FIG. 1. The memory controller 1310 may output oscillating clock signals (e.g., a differential external clock signal pair DCK) during a clock operation period. During a clock interruption period, the memory controller 1310 may output clock signals (e.g., a differential external clock signal pair DCK) having a logic low.

The memory bus 1340 may be implemented as one channel including a plurality of signal lines or a plurality of channels between the memory controller 1310 and connecting pins 1306 of the memory module 1320. The memory bus 1340 may include command/address signal lines for transmitting commands/addresses and data lines for transmitting data.

The memory module 1320 is configured to perform processing functions and may include a clock driver 1330 coupled to a printed circuit board 1302, a plurality of memory devices 1321 to 1329, and the SPD memory device 1304. For example, the memory module 1320 may be implemented as an RDIMM, an LRDIMM, an FBDIMM, an SODIMM, and the like.

The clock driver 1330 may correspond to the clock driver 121 of FIG. 1. Accordingly, the clock driver 1330 may perform the operations described above with reference to FIGS. 1 to 13. That is, the clock driver 1330 may output a chip enable signal (e.g., CHIP_EN of FIG. 1) to each of the memory devices 1321 to 1329 from the differential external clock signal pair DCK.

The memory devices 1321 to 1329 may write data or read data. For example, the memory devices 1321 to 1329 may be DRAM devices. However, the scope of the present disclosure is not limited thereto, and the memory devices 1321 to 1329 may be any one of volatile memory devices, such as SDRAM, DDR SDRAM, LPDDR SDRAM, GDDR SDRAM, DDR2 SDRAM, DDR3 SDRAM, DDR4 SDRAM, and DDR5 SDRAM.

The memory devices 1321 to 1329 may be referred to as memory chips. Each memory chip may be enabled or disabled according to a logic level of a chip enable signal (e.g., CHIP_EN of FIG. 1).

It should be readily apparent to those skilled in the art that the structure of the present disclosure may be modified or changed in various ways without departing from the scope or spirit of the present disclosure. In view of the foregoing, modifications and variations of the present disclosure fall within the scope of the following claims and equivalents, such that the present disclosure covers variations and modifications of the inventive concept.

While certain embodiments have been particularly shown and described with reference to embodiments thereof, it will be understood that various changes in form and details may be made therein without departing from the spirit and scope of the following claims.

What is claimed is:

1. A clock driver comprising:
 a differential buffer configured to output a differential amplified clock signal pair in which differential amplified clock signals thereof oscillate in phases opposite to each other during a clock operation period, and saturate to different respective levels during a clock interruption period, based on a differential external clock signal pair in which differential external clock signals thereof oscillate in phases opposite to each other during the clock operation period and have a certain logic level during the clock interruption period; and
 a signal coupler configured to generate a differential internal clock signal pair in which differential internal clock signals thereof oscillate in phases opposite to each other to levels higher and lower than a first reference level during the clock operation period, and each saturates to a level lower than the first reference level during the clock interruption period, based on the differential amplified clock signal pair, and configured to output a chip enable signal based on the differential internal clock signal pair, to a memory chip.

2. The clock driver of claim 1, wherein the differential buffer includes:
at least one amplifier configured to amplify the differential external clock signal pair and thereby output a differential amplified signal pair; and
a differential comparator configured to compare the differential amplified signal pair with a second reference level and output a comparison result of the comparison as a differential amplified clock signal pair.

3. The clock driver of claim 2, wherein the second reference level is lower than the first reference level.

4. The clock driver of claim 1, wherein the signal coupler includes:
a filtering circuit configured to output a first differential internal clock signal pair by filtering the differential amplified clock signal pair;
a differential comparison circuit configured to compare the first differential internal clock signal pair with the first reference level and output a comparison result as a second differential internal clock signal pair; and
a logical disjunction circuit configured to perform an OR operation on the second differential internal clock signal pair and output an OR operation result as the chip enable signal.

5. The clock driver of claim 4, wherein the filtering circuit includes:
a first high pass filter configured to filter a true signal of the differential amplified clock signal pair and correspondingly output a true signal of the first differential internal clock signal pair; and
a second high pass filter configured to filter a complement signal of the differential amplified clock signal pair and correspondingly output a complement signal of the first differential internal clock signal pair.

6. The clock driver of claim 5, wherein the first high pass filter and the second high pass filter each include an amplifier, at least one capacitor coupled to an input terminal of the amplifier, and at least one resistor connected between the input terminal and an output terminal of the amplifier.

7. The clock driver of claim 4, wherein the differential comparison circuit includes:
a first differential comparator configured to compare a true signal of the first differential internal clock signal pair with the first reference level and correspondingly output a true signal of the second differential internal clock signal pair; and
a second differential comparator configured to compare a complement signal of the first differential internal clock signal pair with the first reference level and correspondingly output a complementary signal of the second differential internal clock signal pair.

8. The clock driver of claim 1, wherein during the clock operation period:
the differential external clock signal pair, the differential amplified clock signal pair, and the differential internal clock signal pair oscillate, and
the chip enable signal has a logic high level to enable the memory chip.

9. The clock driver of claim 1, wherein during the clock interruption period:
the certain logic level is a logic low level,
the differential external clock signal pair has the logic low level;
the differential amplified clock signal pair saturates to different levels, respectively;
the differential internal clock signal pair saturates to the same level lower than the first reference level; and
the chip enable signal has the logic low level to disable the memory chip.

10. A method of operating a clock driver, the method comprising:
outputting a differential amplified clock signal pair in which differential amplified clock signals thereof oscillate in phases opposite to each other during a clock operation period and saturate to different respective levels during a clock interruption period, based on a differential external clock signal pair in which differential external clock signals thereof oscillate in phases opposite to each other during the clock operation period and have a specific logic level during the clock interruption period;
generating a differential internal clock signal pair in which differential internal clock signals thereof oscillate in phases opposite to each other higher or lower than a first reference level during the clock operation period and saturate to a level lower than the first reference level during the clock interruption period, based on the differential amplified clock signal pair; and
providing a chip enable signal to a memory chip based on the differential internal clock signal pair.

11. The method of claim 10, wherein the outputting of the differential amplified clock signal pair includes:
amplifying the differential external clock signal pair and correspondingly outputting a differential amplified signal pair; and
comparing a second reference level lower than the first reference level with the differential amplified signal pair and outputting a comparison result thereof as the differential amplified clock signal pair.

12. The method of claim 10, wherein the generating of the differential internal clock signal pair includes:
outputting a first differential internal clock signal pair by filtering the differential amplified clock signal pair; and
comparing the first differential internal clock signal pair with the first reference level and outputting a comparison result thereof as a second differential internal clock signal pair,
wherein the outputting of the chip enable signal includes:
performing an OR operation on the second differential internal clock signal pair and outputting an OR operation result as the chip enable signal.

13. The method of claim 12, wherein the outputting of the first differential internal clock signal pair includes:
outputting a true signal of the first differential internal clock signal pair by high-pass filtering a true signal of the differential amplified clock signal pair; and
outputting a complement signal of the first differential internal clock signal pair by high- pass filtering a complement signal of the differential amplified clock signal pair.

14. The method of claim 12, wherein the outputting of the comparison result as a second differential internal clock signal pair includes:
outputting a true signal of the second differential internal clock signal pair by comparing a true signal of the first differential internal clock signal pair with the first reference level; and outputting a complement signal of the second differential internal clock signal pair by comparing a complement signal of the first differential internal clock signal pair with the first reference level.

15. The method of claim 10, wherein during the clock interruption period:
the specific logic level is a logic low level,
the differential external clock signal pair has the logic low level,
the differential amplified clock signal pair saturates to different levels, respectively,
the differential internal clock signal pair saturates to the same level, which is lower than the first reference level, and
the chip enable signal has the logic low level to disable the memory chip.

16. A memory device comprising:
a memory chip configured to enable or disable according to a logic level of a chip enable signal; and
a clock driver configured to output the chip enable signal based on a differential external clock signal pair including differential signals that oscillate in phases opposite to each other during a clock operation period and have a specific logic level during a clock interruption period, wherein the clock driver includes:
a differential buffer configured to output a differential amplified clock signal pair including differential signals that oscillate in phases opposite to each other during the clock operation period and saturate to different levels during the clock interruption period, based on the differential external clock signal pair; and
a signal coupler configured to generate differential internal clock signals that oscillate in phases opposite to each other to levels higher and lower than a first reference level during the clock operation period and saturate to a level lower than the first reference level during the clock interruption period, based on the differential amplified clock signal pair, and configured to output the chip enable signal based on the differential internal clock signal pair.

17. The memory device of claim 16, wherein the differential buffer includes:
at least one amplifier configured to amplify the differential external clock signal pair and output a differential amplified signal pair; and
a differential comparator configured to compare a second reference level that is lower than the first reference level with the differential amplified signal pair and output a comparison result as the differential amplified clock signal pair.

18. The memory device of claim 16, wherein the signal coupler includes:
a filtering circuit configured to output a first differential internal clock signal pair by filtering the differential amplified clock signal pair;
a differential comparison circuit configured to compare the first differential internal clock signal pair with the first reference level and output a comparison result as a second differential internal clock signal pair; and
an OR operation circuit configured to perform an OR operation on the second differential internal clock signal pair and output an OR operation result as the chip enable signal.

19. The memory device of claim 16, wherein during the clock operation period:
the differential external clock signal pair, the differential amplified clock signal pair, and the differential internal clock signal pair oscillate, and
the chip enable signal has a logic high level indicating to enable the memory chip.

20. The memory device of claim 16, wherein during the clock interruption period:
the specific logic level is a logic low level,
the differential external clock signal pair has the logic low level,
the differential amplified clock signal pair saturates to different levels, respectively,
the differential internal clock signal pair saturates to the same level that is lower than the first reference level, and
the chip enable signal has the logic low level instructing to disable the memory chip.

* * * * *